3,849,432
CERTAIN THIADIAZOLYL-CONTAINING-HALOGEN-SUBSTITUTED-IMIDAZOLIDINONES
Carl Metzger, Wuppertal-Elberfeld, and Ludwig Eue, Cologne, Germany, assignors to Bayer Aktiengesellschaft, Leverkusen, Germany
No Drawing. Filed May 9, 1972, Ser. No. 251,666
Claims priority, application Germany, May 12, 1971, P 21 23 450.4
Int. Cl. C07d 99/10
U.S. Cl. 260—306.8 D     20 Claims

ABSTRACT OF THE DISCLOSURE

Certain novel imidazolidinone-(2) compounds of the formula:

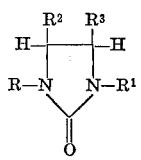

in which

R is a 1,3,4-thiadiazol-2-yl radical, which radical may optionally be substituted in the 5-position,
$R^1$ is lower alkyl, lower alkenyl or lower alkynyl (i.e., containing up to about 10 carbon atoms)
$R^2$ is halogen, and
$R^3$ is halogen, lower alkoxy, lower alkenyloxy, lower alkynyloxy, lower alkylthio, lower alkenylthio or lower alkynylthio, possess remarkable herbicidal potency and act selectively against weed in crop cultivations.

---

The present invention relates to certain new imidazolidinone compounds, to herbicidal compositions containing them and to their use as herbicides.

It is known that certain imidazolidinone derivatives, for example 1-(benzthiazol-2'-yl)-3-methyl-4,5-dihydroxy-imidazolidin-2-one, are effective as herbicides (see Belgian Patent Specification 743,708). The herbicidal potency of these imidazolidinone derivatives of the prior art, however, is not always satisfactory under conditions obtaining in practice.

The present invention provides, as new compounds, the imidazolidinone-(2) derivatives of the general formula

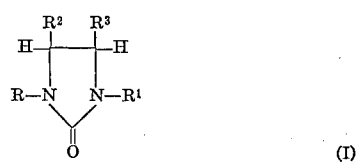

in which

R is a 1,3,4-thiadiazol-2-yl radical, which radical may optionally be substituted in the 5-position,
$R^1$ is lower alkyl, lower alkenyl or lower alkynyl (i.e., containing up to about 10 carbon atoms)
$R^2$ is halogen, and
$R_3$ is halogen, lower alkoxy, lower alkenyloxy, lower alkynyloxy, lower alkylthio, lower alkenylthio or lower alkynylthio (i.e., containing up to about 10 carbon atoms)

In the above formula, it is preferred that R be a 1,3,4-thiadiazol-2-yl radical which may be substituted in the 5-position by straight-chain or branched alkyl, alkenyl or alkynyl with, in each case, preferably up to 6 carbon atoms (especially tert.-butyl or methyl), or by alkoxy, alkylthio, alkenylthio, alkynylthio, alkoxyalkyl or alkoxy-alkylthio with, in each case, up to 6 carbon atoms in the or each aliphatic moiety, by haloalkyl or preferably up to 4 carbon atoms (estrihalomethyl), by cycloalkyl or halocycloalkyl of, in either case, preferably 5 to 8 carbon atoms, by alkylsulphoxyl, alkenylsulphoxyl, alkynylsulphoxyl, alkylsulphonyl, alkenylsulphonyl or alkynylsulphonyl of, in each case, preferably up to 6 carbon atoms, by aralkylsulphoxyl, aralkylsulphonyl, optionally substituted aralkyl or optionally substituted aralkylthio of, in each case, preferably 6 to 10 carbon atoms in the aryl moiety and 1 to 4 carbon atoms in the alkylene moiety, or by optionally substituted aryl of preferably 6 to 10 carbon atoms;

$R^1$ is preferably alkyl of up to 4 carbon atoms or alkenyl or alkynyl of, in either case, up to 6 carbon atoms (especially methyl, ethyl, isopropyl, tert.-butyl, vinyl, allyl, ethynyl or propargyl);
$R^2$ is preferably chlorine or bromine;
and $R^3$ is preferably chlorine, bromine, alkoxy, alkenyloxy, alkynyloxy, alkylthio, alkenylthio or alkynylthio all from of from in each case, up to 4 carbon atoms; most preferably, $R^3$ is methoxy or ethoxy.

The compounds of the formula (I), and most especially those indicated as preferred, have been found to exhibit strong herbicidal, especially selectively herbicidal, properties. Surprisingly, the imidazolidinone-(2) derivatives according to the present invention show a higher herbicidal activity, with simultaneous selectivity with respect to agriculturally cultivated plants, than the known imidazolidinone derivatives which are the chemically closest active compounds of the same type of activity. The compounds according to the present invention therefore represent an enrichment of the art.

The present invention also provides a process for the preparation of an imidazolidinone-(2) derivative of the formula (I) in which an imidazolidinone-(2) of the general formula

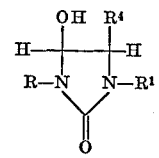

in which

R and $R^1$ have the meanings stated above, and
$R^4$ has one of the meanings stated for $R^3$ in formula (I) above or is hydroxy is reacted with a halogenating agent, for example thionyl chloride, phosphorus oxychloride, phosphorus trichloride or phosphorus pentachloride, optionally in the presence of a diluent and optionally in the presence of an acid-binding agent.

If 1-(5'-tert.-butyl-1',3',4'-thiadiazol-2'-yl)-3-methyl-4,5-dihydroxyimidazolidinone-(2) and thionyl chloride are used as starting materials, the reaction course can be represented by the following formula scheme:

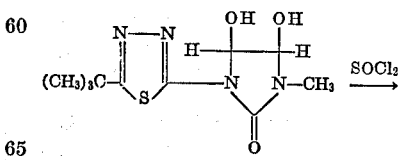

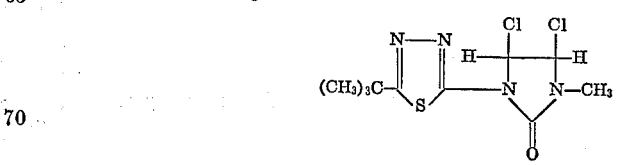

As examples of the imidazolidinone-(2) derivatives of the formula (II) that can be used according to the invention, there may be mentioned:

1-(5'-methylsulphonyl-1',3',4'-thiadiazol-2'-yl)-3-methyl-4,5-dihydroxy-imidazolidinone-(2)
1-(5'-methylsulphonyl-1',3',4'-thiadiazol-2'-yl)-3-methyl-4-methoxy-5-hydroxy-imidazolidinone-(2)
1-(5'-methylsulphonyl-1',3',4'-thiadiazol-2'-yl)-3-methyl-4-ethoxy-5-hydroxy-imidazolidinone-(2)
1-(5'-tert.-butyl-1',3',4'-thiadiazol-2'yl)-3-methyl-4-methoxy-5-hydroxy-imidazolidinone-(2)
1-(5'-tert.-butyl-1',3',4'-thiadiazol-2'-yl)-3-methyl-4-ethoxy-5-hydroxy-imidazolidinone-(2)
1-(5'-trifluoromethyl-1',3',4'-thiadiazol-2'-yl)-3-methyl-4-methoxy-5-hydroxy-imidazolidinone-(2)
1-(5'-trifluoromethyl-1',3',4'-thiadiazol-2'-yl)-3-methyl-4-ethoxy-5-hydroxy-imidazolidinone-(2)
1-(5'-trifluoromethyl-1',3',4'-thiadiazol-2'-yl)-3-ethyl-4,5-dihydroxy-imidazolidinone-(2)
1-(5'-methylthio-1',3',4'-thiadiazol-2'-yl)-3-methyl-4,5-dihydroxy-imidazolidinone-(2)
1-(5'-methylthio-1',3',4'-thiadiazol-2'-yl)-3-methyl-4-methoxy-5-hydroxy-imidazolidinone-(2)
1-(5'-methylthio-1',3',4'-thiadiazol-2'-yl)-3-methyl-4-methoxy-5-hydroxy-imidazolidinone-(2)
1-(5'-methylthio-1',3',4'-thiadiazol-2'-yl)-3-methyl-4-ethoxy-5-hydroxy-imidazolidinone-(2)
1-(5'-p-chlorophenyl-1',3',4'-thiadiazol-2'-yl)-3-methyl-4-methoxy-5-hydroxy-imidazolidinone-(2)
1-(5'-m-trifluoromethylphenyl-1'3',4'-thiadiazol-2'-yl)-3-methyl-4-methoxy-5-hydroxy-imidazolidinone-(2)
1-(5'-ethoxy-1',3',4'-thiadiazol-2'-yl)-3-methyl-4-ethoxy-5-hydroxy-imidazolidinone-(2).

The imidazolidinone-(2) derivatives of the formula (II) used as starting materials have not hitherto been described in the literature; they can, however, be prepared according to known processes, namely by condensation of urea derivatives with glyoxal in the presence of an alkaline catalyst and, optionally, in the presence of a diluent, at temperatures between 0° and 80° C., preferably between 20° and 40° C. (see Belgian Patent Specification 743,708 and the preparative Examples herein).

As a diluent for the reaction according to this invention, any inert organic solvent is suitable, especially a hydrocarbon, such as benzene, toluene or xylene, or a halogenated hydrocarbon, such as chloroform, methylene chloride, carbon tetrachloride, 1,3 - dichlorobenzene or 1,2-dichlorobenzene.

As an acid-binding agent, any customary acid-binder, such as an alkali metal hydroxide, an alkali metal carbonate or an organic base, can be used. Preferably, however, the work is carried out within addition of an acid-binder, and the acid formed during the reaction is removed by concentration or hydrolysis.

The reaction temperatures can be varied within a fairly wide range. In general, the work is carried out at from 0° to 100° C., preferably from 20° to 80° C., and at normal pressure.

When carrying out the process according to the invention, there is preferably used, for 1 mole of the imidazolidinone-(2) derivative of the formula (II), an approximately 10% excess of halogenating agent. An exceeding of the stoichiometric proportions stated brings no significant improvement of yield.

The isolation of the compounds of the formula (I) is effected by distilling off the solvent and recrystallization of the resultant residue.

The preparation of the compounds if this invention and the process of this invention is illustrated by the following preparative Examples, which should not be regarded as limitative:

EXAMPLE 1

Preparation of 1-(5'-tert.-butyl-1',3',4'-thiadiazol-2'-yl)-3-methyl-4,5-dichloroimidazolidinone-(2)

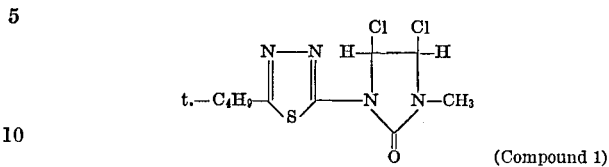

(Compound 1)

To a solution of 81.6 g. (0.3 mole) of 1-5'-tert.-butyl-1',3',4' - thiadiazol - 2' - yl) - 3 - methyl - 4,5 - dihydroxy-imidazolidinone-(2) in 300 ml. of methylene chloride there were added dropwise, with external cooling and an internal temperature of 25° C., 78.5 g. (0.6 mole) of thionyl chloride. Thereafter, heating under reflux is effected for one hour, the solvent was distilled off in a vacuum, and the residue was recrystallized from ethyl acetate.

1 - (5-tert. - butyl - 1',3',4' - thiadiazol - 2' - yl) - 3 - methyl - 4,5 - dichloroimidazolidinone - (2) having a melting point of 160–161° C. was obtained.

The compound (a) required as the starting material was prepared as follows:

(a)

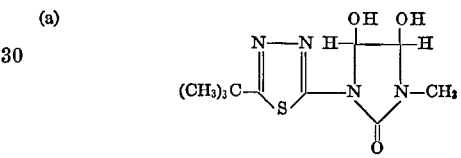

To a solution of 45.4 g. (0.2 mole) of 1-(5'-tert.-butyl-1',3',4' - thiadiazol - 2' - yl) - 3 - methylurea in 500 ml. of ethanol there were added dropwise 100 ml. of a 30%-strength aqueous glyoxal solution which beforehand was adjusted to pH 7 to 8 with a dilute solution of sodium hydroxide. After standing overnight, the solvent was distilled off in a vacuum, and water was added to the residue. After recrystallization from methanol, 1 - (5'-tert. - butyl-1',3',4' - thiadiazol - 2' - yl) - 3 - methyl - 4,5 - dihydroxyimidazolidinone-(2) was obtained in crystalline form; melting point: 163° C.

Other illustrative starting materials ( (b) to (g), below) were prepared as follows:

(b)

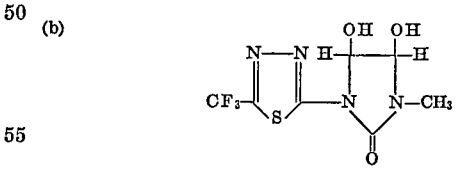

To a solution of 45.4 g. (0.2 mole) of N-trifluoromethyl-1,2,4 - thiadiazol - 2 - yl) - N - methylurea in 500 ml. of ethanol there were added dropwise 100 ml. of a 30%-strength aqueous glyoxal solution which beforehand was adjusted to pH 7 to 8 with a dilute solution of sodium hydroxide. After standing overnight, the solvent was distilled off in a vacuum, and water was added.

To a solution of 45.4 g. (0.2 mole) of N-trifluoromethyl-1,2,4-thiadiazol-2-yl)-N-methylurea in 500 ml. of ethanol there were added dropwise 100 ml. of a 30%-strength aqueous glyoxal solution which beforehand was adjusted to pH 7 to 8 with a dilute solution of sodium hydroxide. After standing overnight, the solvent was distilled off in a vacuum, and water was added to the residue. After recrystallization from acetonitrile, 1-(5'-trifluoromethyl-1',3',4'-thiadiazol-2'-yl) - 3 - methyl - 4,5-dihydroxyimidazolidinone-(2) was obtained in crystalline form; melting point: 178° C.

In a manner analogous to that above, the following compounds were prepared:

(c)
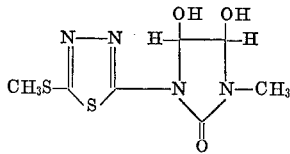
m.p. 67°C and (d)
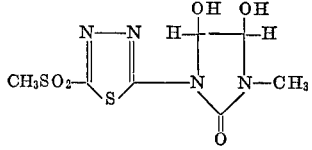
m.p. 55°C (f)
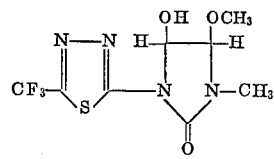
m.p. 148°C.

and (g)
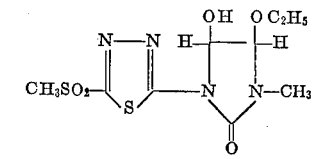
m.p. 141°C.

In a manner analogous to that described in Example 1, the following compounds of this invention, set forth in Table 1, below, can be prepared:

TABLE I

| Compound number | Compound name | R | R¹ | R² | R³ | Melting point, °C. |
|---|---|---|---|---|---|---|
| 2 | 1-(5'-trifluoromethyl-1',3',4'-thiadizazol-2'-yl)-3-methyl-4,5-dichloro-imidazolidinone-(2). | (CF₃-thiadiazolyl) | CH₃ | Cl | Cl | 164 |
| 3 | 1-(5'-trifluoromethyl-1',3',4'-thiadiazol-2'-yl)-3-methyl-4-methoxy-5-chloroimidazolidinone-(2). | Same as above | CH₃ | Cl | OCH₃ | 99 |
| 4 | 1-(5'-trifluoromethyl-1',3',4'-thiadiazol-2'-yl)-3-methyl-4-ethoxy-5-chloroimidazolidinone-(2). | do | CH₃ | Cl | OC₂H₅ | 65 |
| 5 | 1-(5'-methylsulfonyl-1',3',4'-thiadiazol-2'-yl(-3-methyl-4,5-dichloro-imidazolidinone-(2). | (CH₃SO₂-thiadiazolyl) | CH₃ | Cl | Cl | 12 |
| 6 | 1-(5'-methysulfonyl-1',3',4'-thiadiazol-2'-yl)-3-methyl-4-methoxy-5-chloroimidazolidinone-(2). | Same as above | CH₃ | Cl | OCH₃ | 95 |
| 7 | 1-(5'-methylsulfonyl-1',3',4'-thiadiazol-2'-yl)-3-methyl-4-ethoxy-5-chloroimidazolidinone-(2). | Same as above | CH₃ | Cl | OC₂H₅ | 72 |
| 8 | 1-(5'-methylthio-1',3',4'-thiadiazol-2'-yl)-3-methyl-4,5-dichloroimidazolidinone-(2). | (CH₃S-thiadiazolyl) | CH₃ | Cl | Cl | 101 |
| 9 | 1-(5'-methylthio-1',3',4'-thiadiazol-2'-yl)-3-methyl-4-methoxy-5-chloroimidazolidinone-(2). | Same as above | CH₃ | Cl | OCH₃ | 73 |
| 10 | 1-(5'-methylthio-1',3',4'-thiadiazol-2'-yl)-3-methyl-4-ethoxy-5-chloroimidazolidinone-(2). | do | CH₃ | Cl | OC₂H₅ | 58 |
| 11 | 1-(5'-tert.-butyl-1',3',4'-thiadiazol-2'-yl)-3-methyl-4-methoxy-5-chloroimidazolidinone-(2). | (t-C₄H₉-thiadiazolyl) | CH₃ | Cl | OCH₃ | 57 |
| 12 | 1-(5'-tert.-butyl-1',3',4'-thiadiazol-2'-yl)-3-methyl-4-ethoxy-5-chloro-imidazolidinone-(2). | Same as above | CH₃ | Cl | OC₂H₅ | 39 |
| 13 | 1-(5'-ethylsulfonyl-1'-3',4'-thiadiazol-2'-yl)-3-methyl-4,5-dichloro-imidazolidinone-(2). | (C₂H₅SO₂-thiadiazolyl) | CH₃ | Cl | Cl | 85 |

(e)
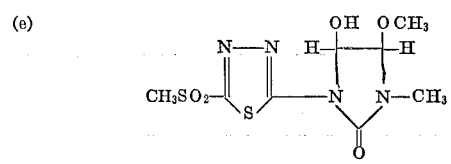
m.p. 140°C 43.9 g. (0.15 mole) of 1-(5-methylsulphonyl-1,2,4-thiadiazol - 2 - yl) - 3 - methyl-4,5-dihydroxyimidazolidinone-(2) were heated under reflux for 24 hours with 100 ml. of absolute methanol and 2 ml. of concentrated sulphuric acid. Subsequently, concentration in a vacuum was effected. After rubbing, 1-(5'-methylsulphonyl-1',3',4'-thiadiazol-2'-yl)-3-methyl-4-methoxy-5-hydroxyimidazolidinone-(2) crystallized out. It was recrystallized from methanol. Melting point: 140° C.

In a manner analogous to that above, the following compounds can also be prepared.

The active compounds according to the present invention possess excellent herbicidal properties and can therefore be used for the control of weeds. By weeds in the widest sense are meant all plants which grow in places where they are not desired. Whether the substances according to the invention act as total or as selective herbicides depends essentially on the amount applied.

The substances according to the invention can be used, for example in the case of the following plants: dicotyledons, such as mustard (Sinapis), cress (Lepidium), cleavers (Galium), chickweed (Stellaria), chamomile (Matricaria), gallant soldier (Galinsoga), goosefoot (Chenopodium), annual nettle (Urtica), groundsel (Senecio), cotton (Gossypium), beets (Beta), carrots (Daucus), beans (Phaseolus), potatoes (Solinum) and coffee (Coffea), as well as monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum) and sugar cane (Saccharum).

The compounds are especially suitable for selective weed control in cereals, cotton, rice and other cultivations. They can advantageously also be used for the control of spring wild oats.

The active compounds according to the present invention can be converted into the usual formulations, such as solutions, emulsions, suspensions, powders, pastes and granulates. These may be produced in known manner, for example by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chlorethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulphoxide or acetonitrile, as well as water.

By liquefied gaseous diluents or carriers are meant liquids which would be gaseous at normal temperatures and pressures, for example aerosol propellants, such as halogenated hydrocarbons, for example Freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulphonates, alkyl sulphates and aryl sulphonates; and preferred examples of dispersing agents include lignin, sulphite waste liquors and methyl cellulose.

The active compounds according to the invention may be present in the formulations in admixture with other active compounds or may be admixed thereto at the time of application.

The formulations contain, in general, from 0.1 to 95, preferably from 0.5 to 90, percent by weight of active compound.

The active compounds may be applied as such, in the form of their formulations or in the application forms prepared therefrom, such as ready-to-use solutions, emulsions, suspensions, powders, pastes and granulates. Application may take place in any usual manner, for example by spraying, squirting, dusting or scattering.

When the compounds are applied as total herbicides, the amounts of active compound are generally from 20 to 40 kg./hectare. In the case of use for selective week control, the applied amounts are generally from 0.1 to 15 kg./hectare, preferably from 1 to 10 kg./hectare.

The active compounds can be used both before and after the emergence of the cultivated plants and weeds.

The present invention also provides a herbicidal composition containing as active ingredient a compound of the present invention in admixture with a solid or liquefied gaseous diluent or carrier or in admixture with a liquid diluent or carrier containing a surface-active agent.

The present invention also provides a method of combating weeds which comprises applying to the weeds or a weed habitat a compound of the present invention alone or in the form of a composition containing as active ingredient a compound of the present invention in admixture with a diluent or carrier.

The present invention further provides crops protected from damage by weeds by being grown in areas in which immediately prior to and/or during the time of the growing a compound of the present invention was applied alone or in admixture with a diluent or carrier. It will be seen that the usual methods of providing a harvested crop may be improved by the present invention.

The herbicidal effectiveness of the compounds of this invention is illustrated in and by the following test Examples.

EXAMPLE A

Post-emergence test

Solvent: 5 parts by weight acetone
Emulsifier: 1 part by weight alkylarylpolyglycol ether To produce a suitable preparation of active compound, 1 part by weight of active compound was mixed with the stated amount of solvent, the stated amount of emulsifier was added and the concentrate was then diluted with water to the desired concentration.

Test plants which have a height of 5–15 cm. were sprayed with the preparation of the active compound so that the amounts of active compound per unit area which were stated in the Table were applied. Depending on the concentration of the spray liquor, the amount of water applied lay between 1,000 and 2,000 litres/hectare. After three weeks, the degree of damage to the plants was determined and characterised by the values 0–5, which have the following meaning:

0 no effect
1 a few slightly burnt spots
2 marked damage to leaves
3 some leaves and parts of stalks partially dead
4 plant partially destroyed
5 plant completely dead.

The active compounds, the amounts applied and the results are set forth in the following Table:

TABLE A
[Post-emergence test]

| Active compound | Active compound applied, kg./hectare | Echino-chloa | Cheno-podium | Sinapis | Oats | Cotton | Wheat |
|---|---|---|---|---|---|---|---|
| 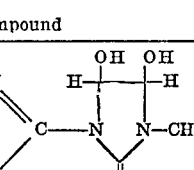 (known) | 1<br>0.5 | 3<br>3 | 3<br>3 | 5<br>5 | 3<br>2 | 3<br>2 | 3<br>3 |
| 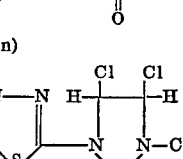 (Compound 1) | 1<br>0.5 | 5<br>5 | 5<br>4 | 5<br>5 | 4<br>3 | 4<br>1 | 0<br>4 |

EXAMPLE B

Pre-emergence test

Solvent: 5 parts by weight acetone
Emulsifier: 1 part by weight alkylarylpolyglycol ether To produce a suitable preparation of active compound, 1 part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compound. It was expedient to keep constant the amount of water per unit area. The concentration of the active compound in the preparation was of no importance, only the amount of active compound applied per unit area being decisive. After three weeks, the degree of damage to the test plants was determined and characterised by the values 0–5, which have the following meaning:

0 no effect
1 slight damage or delay in growth
2 marked damage or inhibition of growth
3 heavy damage and only deficient development or only 50% emerged
4 plants partially destroyed after germination or only 25% emerged
5 plants completely dead or not emerged.

The active compounds, the amounts applied and the results obtained can be seen from the following Table:

TABLE B
[Pre-emergence test]

| Active compound | Active compound applied, kg./hectare | Echino- chloa | Cheno- podium | Sina- pis | Stel- laria | Lol- ium | Matri- caria | Oats | Cot- ton | Wheat | Maize | Rice |
|---|---|---|---|---|---|---|---|---|---|---|---|---|
| (known) benzothiazole compound | 10 / 5 | 1 / 1 | 2 / 1 | 5 / 4 | 5 / 4 | 0 / 0 | 3 / 2 | 4 / 4 | 1 / 0 | 2 / 0 | 3 / 2 | — / — |
| (Compound 1) t.-$C_4H_9$- thiadiazole | 10 / 5 | 5 / 5 | 5 / 5 | 5 / 5 | 5 / 5 | 5 / 5 | 5 / 5 | 5 / 5 | 4 / 3 | 1 / 0 | 4 / 4 | 0 / 2 |

It will be understood that the specification and examples are illustrative but not limitative of the present invention and that other embodiments within the spirit and scope of the invention will suggest themselves to those skilled in the art.

What is claimed is:

1. Imidazolidinone-(2) compound of the formula:

$$\begin{array}{c} R^2 \quad R^3 \\ H{-}\!\!\!-\!\!\!-H \\ R{-}N \quad N{-}R^1 \\ \diagdown C \diagup \\ \| \\ O \end{array}$$

wherein

R is 1,3,4-thiadiazol-2-yl or 5-substituted 1,3,4-thiadiazol-2-yl wherein the substituent is one of alkyl, haloalkyl, alkylthio, alkylsulfoxy and alkylsulfonyl of up to 6 carbon atoms, $R_1$ is lower alkyl, lower alkenyl, or lower alkynyl of up to 10 carbon atoms, $R_2$ is halogen, and $R_3$ is halogen, lower alkoxy, lower alkenyloxy, lower alkynyloxy, lower alkylthio, lower alkenylthio or lower alkynylthio, containing up to 10 carbon atoms.

2. Compound as claimed in claim 1 wherein R is 1,3,4-thiadiazol-2-yl.

3. Compound as claimed in claim 1 wherein R is 5-substituted 1,3,4 - thiadiazol-2-yl and the substituent is alkyl of up to 6 carbon atoms.

4. Compound as claimed in claim 1 wherein R is 5-substituted 1,3,4-thiadiazol-2-yl wherein the substituent is haloalkyl of up to 6 carbon atoms.

5. Compound as claimed in claim 1 wherein R is 5-substituted 1,3,4-thiadiazol-2-yl wherein the substituent is alkylthio of up to 6 carbon atoms.

6. Compound as claimed in claim 1 wherein R is 5-substituted 1,3,4-thiadiazol-2-yl wherein the substituent is alkylsulphoxyl or alkylsulphonyl of up to 6 carbon atoms.

7. Compound as claimed in claim 1 wherein R is 5-substituted 1,3,4-thiadiazol-2-yl wherein the substituent is tert-butyl.

8. Compound as claimed in claim 1 wherein R is 5-substituted 1,3,4-thiadiazol-2-yl wherein the substituent is trifluoromethyl.

9. Compound as claimed in claim 1 wherein $R_1$ is alkyl of from 1 to 4 carbon atoms.

10. Compound as claimed in claim 1 wherein $R_1$ is alkyl of 1 to 2 carbon atoms.

11. Compound as claimed in claim 1 wherein $R_2$ is chlorine or bromine.

12. Compound as claimed in claim 1 wherein $R_3$ is chlorine or bromine.

13. Compound as claimed in claim 1 wherein $R_3$ is alkoxy of up to 4 carbon atoms.

14. Compound as claimed in claim 1 wherein $R_3$ is alkenyloxy of up to 4 carbon atoms.

15. Compound as claimed in claim 1 designated 1-(5'-tert.-butyl-1',3',4'-thiadiazol-2'-yl) - 3 - methyl - 4,5 - dichloroimidazolidinone-(2).

16. Compound as claimed in claim 1 designated 1-(5'-trifluoromethyl-1',3',4'-thiadiazol-2'-yl) - 3 - methyl - 4,5-dichloroimidazolidinone-(2).

17. Compound as claimed in claim 1 designated 1-(5'-trifluoromethyl - 1',3',4' - thiadiazol-2'-yl) - 3 - methyl-4-methoxy-5-chloroimidazolidinone-(2).

18. Compound as claimed in claim 1 designated 1-(5'-tert.-butyl - 1',3',4' - thiadiazol-2'-yl)-3-methyl-4-ethoxy-5-chloroimidazolidinone-(2).

19. Compound as claimed in claim 1 designated 1-(5'-methylsulfonyl - 1',3',4' - thiadiazol-2'-yl)-3-methyl-4,5-dichloroimidazolidinone-(2).

20. Compound as claimed in claim 1 designated 1-(5'-ethylsulfonyl - 1',3',4' - thiadiazol - 2' - yl)-3-methyl-4-methoxy-5-chloroimidazolidinone-(2).

References Cited

UNITED STATES PATENTS

| | | | |
|---|---|---|---|
| 3,419,575 | 12/1968 | Griss | 260—306.8 D |
| 3,573,317 | 3/1971 | Smith | 260—306.8 D |
| 3,694,452 | 9/1972 | Papaioannou | 260—306.8 D |
| 3,758,492 | 9/1973 | Metzger et al. | 260—306.8 D |

RICHARD J. GALLAGHER, Primary Examiner

U.S. Cl. X.R.

71—90; 260—305